US009469337B2

(12) United States Patent
Urbach et al.

(10) Patent No.: US 9,469,337 B2
(45) Date of Patent: Oct. 18, 2016

(54) ELECTRIC POWER STEERING ASSEMBLY

(71) Applicant: TRW Automotive U.S. LLC, Livonia, MI (US)

(72) Inventors: Brian A. Urbach, Rochester Hills, MI (US); John F. Santori, Shelby Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/169,180

(22) Filed: Jan. 31, 2014

(65) Prior Publication Data

US 2015/0217799 A1 Aug. 6, 2015

(51) Int. Cl.
*B62D 5/04* (2006.01)
*B62D 7/22* (2006.01)
*F16H 1/32* (2006.01)
*F16D 3/68* (2006.01)
*F16F 15/124* (2006.01)

(52) U.S. Cl.
CPC ........... *B62D 5/0442* (2013.01); *B62D 5/0421* (2013.01); *F16D 3/68* (2013.01); *F16F 15/1245* (2013.01)

(58) Field of Classification Search
CPC . B62D 5/0409; B62D 5/0448; B62D 5/0427
USPC ............................................... 180/443, 444
See application file for complete search history.

(56) References Cited

U.S. PATENT DOCUMENTS

| 5,145,021 A * | 9/1992 | Nakamura | B62D 5/0403 180/444 |
| 6,637,540 B2 * | 10/2003 | Kielar | B62D 5/0421 180/402 |
| 6,763,907 B2 * | 7/2004 | Ueno | B62D 5/0484 180/444 |
| 2006/0054378 A1 * | 3/2006 | Tanaka | B62D 5/0424 180/444 |

OTHER PUBLICATIONS

Article ZF Active Steering for Mid-size and Luxury Cars dated Aug. 2003.

* cited by examiner

*Primary Examiner* — Jacob Knutson
(74) *Attorney, Agent, or Firm* — MacMillan, Sobanski & Todd, LLC

(57) ABSTRACT

A rack drive assembly adapted for use in the vehicle electric power steering assembly includes a steering member operatively connected to a vehicle steering wheel; an electric motor for effecting axial movement of the steering member upon rotation of the vehicle steering wheel; a planetary gear assembly operatively coupled to the electric motor; and a pinion assembly operatively disposed between the planetary gear assembly and the steering member whereby operation of the electric motor is operative to effect axial movement of the steering member, wherein the electric motor includes an output shaft which defines a motor axis and the pinion assembly includes an output shaft which defines a pinion axis, wherein the pinion axis is coaxial with the motor axis and perpendicular with respect to an axis of the steering member.

17 Claims, 3 Drawing Sheets

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, in this type of electric power steering assembly, one or more disadvantages may be in the overall size, cost, packaging and/or operating characteristics of one or more of the components of the rack drive assembly, in particular of the pulley assembly and/or the ball nut assembly, may not be desirable or optimal.

Thus, it would be desirable to provide an improved structure for a rack drive assembly of an electric power steering assembly which reduces and/or improves upon one or more of the above disadvantages and is relatively simple and inexpensive.

SUMMARY OF THE INVENTION

This invention relates to an improved structure for a rack drive assembly adapted for use in a vehicle electric power steering assembly.

According to an embodiment, the rack drive assembly adapted for use in the vehicle electric power steering assembly may comprise, individually and/or in combination, one or more of the following features: a steering member configured to be disposed in a rack housing and including a first rack portion and a second rack portion, the first rack portion operatively connected to a vehicle steering wheel; an electric motor operatively connected to the second rack portion for effecting axial movement of the steering member upon rotation of the vehicle steering wheel; a planetary gear assembly operatively coupled to the electric motor; and a pinion assembly operatively disposed between the planetary gear assembly and the second rack portion whereby operation of the electric motor is operative to effect axial movement of the steering member by the electric motor actuating the planetary gear assembly, which in turn actuates the pinion assembly, which in turn actuates the steering member via the second rack portion; wherein the electric motor includes an output shaft which defines a motor axis and the pinion assembly includes an output shaft which defines a pinion axis, wherein the pinion axis is coaxial with the motor axis and perpendicular with respect to an axis of the steering member.

According to this embodiment, an isolator is provided in a connection which couples together the planetary gear assembly and the pinion assembly.

According to this embodiment, the isolator includes rubber elements provided on at least one of the planetary gear assembly and the pinion assembly.

According to this embodiment, a mounting member is provided between the electric motor and the rack housing, the mounting member configured to contain at least a portion of the planetary gear assembly and at least a portion of the pinion assembly.

According to this embodiment, the mounting member includes internal teeth which are operative to engage with teeth provided on planet gears of the planetary gear assembly.

According to this embodiment, the planetary gear assembly includes a sun gear operatively connected to an output shaft of the electric motor and a plurality of planet gears configured to be actuated by the sun gear and in turn configured to actuate the pinion assembly.

According to this embodiment, the planet gears are configured to be coupled to a carrier of the planetary gear assembly, and the carrier is configured to be operatively coupled to the pinion assembly.

According to this embodiment, an isolator is provided in a connection which couples together the carrier of the planetary gear assembly and the pinion assembly.

According to another embodiment, the rack drive assembly adapted for use in the vehicle electric power steering assembly may comprise, individually and/or in combination, one or more of the following features: a steering member configured to be disposed in a rack housing and including a first rack portion having first rack teeth and a second rack portion having second rack teeth, the first rack portion operatively connected to a vehicle steering wheel; an electric motor operatively connected to the second rack portion for effecting axial movement of the steering member upon rotation of the vehicle steering wheel; a planetary gear assembly operatively coupled to the electric motor; and a pinion assembly operatively disposed between the planetary gear assembly and the second rack portion, the pinion assembly having teeth which engage the teeth of the second rack portion whereby operation of the electric motor is operative to effect axial movement of the steering member by the electric motor actuating the planetary gear assembly, which in turn actuates the pinion assembly, which in turn actuates the steering member via the second rack portion; wherein the electric motor includes an output shaft which defines a motor axis and the pinion assembly includes an output shaft which defines a pinion axis, wherein the pinion axis is coaxial with the motor axis and perpendicular with respect to an axis of the steering member.

According to this embodiment, an isolator is provided in a connection which couples together the planetary gear assembly and the pinion assembly.

According to this embodiment, the isolator includes rubber elements provided on at least one of the planetary gear assembly and the pinion assembly.

According to this embodiment, a mounting member is provided between the electric motor and the rack housing, the mounting member configured to contain at least a portion of the planetary gear assembly and at least a portion of the pinion assembly.

According to this embodiment, the mounting member includes internal teeth which are operative to engage with teeth provided on planet gears of the planetary gear assembly.

According to this embodiment, the planetary gear assembly includes a sun gear operatively connected to an output shaft of the electric motor and a plurality of planet gears configured to be actuated by the sun gear and in turn configured to actuate the pinion assembly.

According to this embodiment, the planet gears are configured to be coupled to a carrier of the planetary gear assembly, and the carrier is configured to be operatively coupled to the pinion assembly.

According to this embodiment, an isolator is provided in a connection which couples together the carrier of the planetary gear assembly and the pinion assembly.

According to yet another embodiment, the rack drive assembly adapted for use in the vehicle electric power steering assembly may comprise, individually and/or in combination, one or more of the following features: a steering member configured to be disposed in a rack housing and including a first rack portion and a second rack portion, the first rack portion operatively connected to a vehicle steering wheel; an electric motor operatively connected to the second rack portion for effecting axial movement of the steering member upon rotation of the vehicle steering wheel; a planetary gear assembly operatively coupled to the electric motor; and a pinion assembly operatively disposed between the planetary gear assembly and the second rack portion whereby operation of the electric motor is operative to effect axial movement of the steering member by the electric motor actuating the planetary gear assembly, which in turn actuates the pinion assembly, which in turn actuates the steering member via the second rack portion; wherein the electric motor includes an output shaft which defines a motor axis and is operatively coupled to the planetary gear assembly, the pinion assembly includes an output shaft which defines a pinion axis and which is operatively coupled to the second rack portion, wherein the pinion axis is coaxial with the motor axis and perpendicular with respect to an axis of the steering member.

According to this embodiment, an isolator is provided in a connection which couples together the planetary gear assembly and the pinion assembly.

According to this embodiment, the isolator includes rubber elements provided on at least one of the planetary gear assembly and the pinion assembly.

According to this embodiment, a mounting member is provided between the electric motor and the rack housing, the mounting member configured to contain at least a portion of the planetary gear assembly and at least a portion of the pinion assembly, wherein the mounting member includes internal teeth which are operative to engage with teeth provided on planet gears of the planetary gear assembly.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
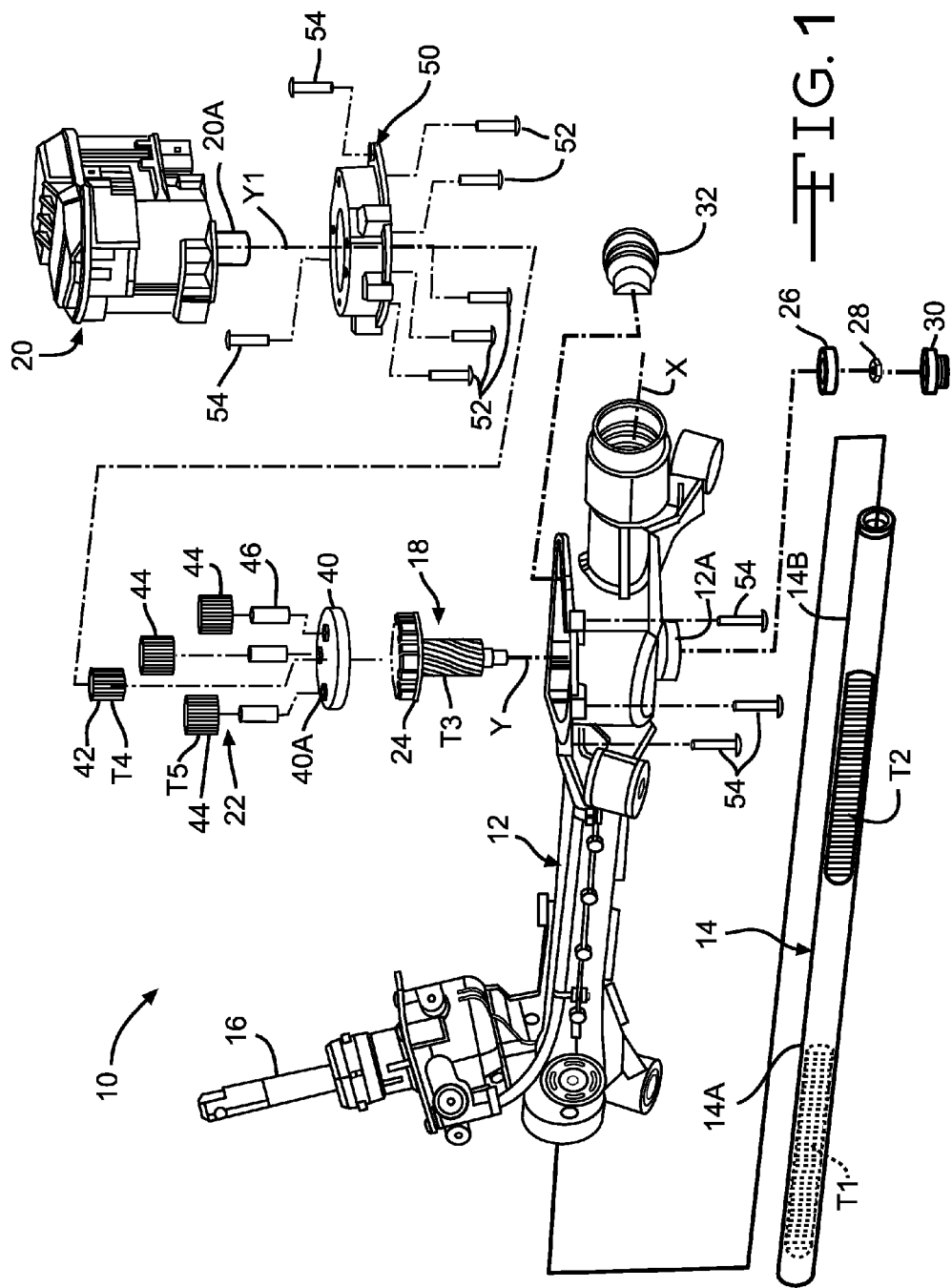
FIG. 1 is a partially exploded view of a portion of an embodiment of a vehicle electric power steering assembly.

Referring now to FIG. 1, there is illustrated an embodiment of a vehicle electric power steering assembly, indicated generally at 10, constructed in accordance with the present invention. The illustrated vehicle electric power steering assembly 10 is an electric "direct motor drive" rack and pinion steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies.

The illustrated electric power steering assembly 10 includes a "one-piece" rack housing, indicated generally at 12, and a steering or rack member, indicated generally at 14, configured to be disposed therein. The steering member 14 is linearly (or axially) movable along a rack axis X. The steering member 14 is connected with steerable wheels (not shown) of the vehicle through tie rods (not shown) located at the distal ends of the steering member 14. Linear movement of the steering member 14 along the rack axis X results in steering movement of the steerable wheels in a known manner.

In the illustrated embodiment, the steering member 14 includes a first rack portion 14A which is provided with a series of first rack teeth (shown in phantom in FIG. 1 at T1) along a portion thereof, which meshly engage gear teeth (not shown) provided on a pinion (not shown) which is operatively connected to a steering wheel (not shown) of the vehicle via an input shaft 16. In the illustrated embodiment, the steering member 14 further includes a second rack portion 14B which is provided with a series of second rack teeth T2 along a portion thereof which, as will be discussed below, meshly engage gear teeth T3 provided on a pinion assembly, indicated generally at 18.

The illustrated electric power steering assembly 10 further includes an electric motor, indicated generally at 20, which as will be discussed below, is operatively or "drivably" configured to be connected to the pinion assembly 18 via a planetary gear assembly, indicated generally at 22, for effecting axial movement of the steering member 14 upon rotation of the vehicle steering wheel. In the event of the inability of the electric motor 20 to effect axial movement of the steering member 14, the mechanical connection between the gear teeth on the pinion and the first rack teeth T1 on the first rack portion 14A of the steering member 14 permits manual steering of the vehicle.

As shown in FIG. 1, in the illustrated embodiment, the pinion assembly 18 includes a main pinion body or output shaft 24, a pinion bearing 26, a pinion nut 28, and a pinion plug 30. The pinion assembly 18 is rotatably supported in a stepped opening 12A provided in the housing 12 by the bearing 26, the nut 28, and the plug 30 and its teeth T3 held in meshing engagement with the teeth T2 of the steering member 14 by a yoke member 32.

Figure 2:
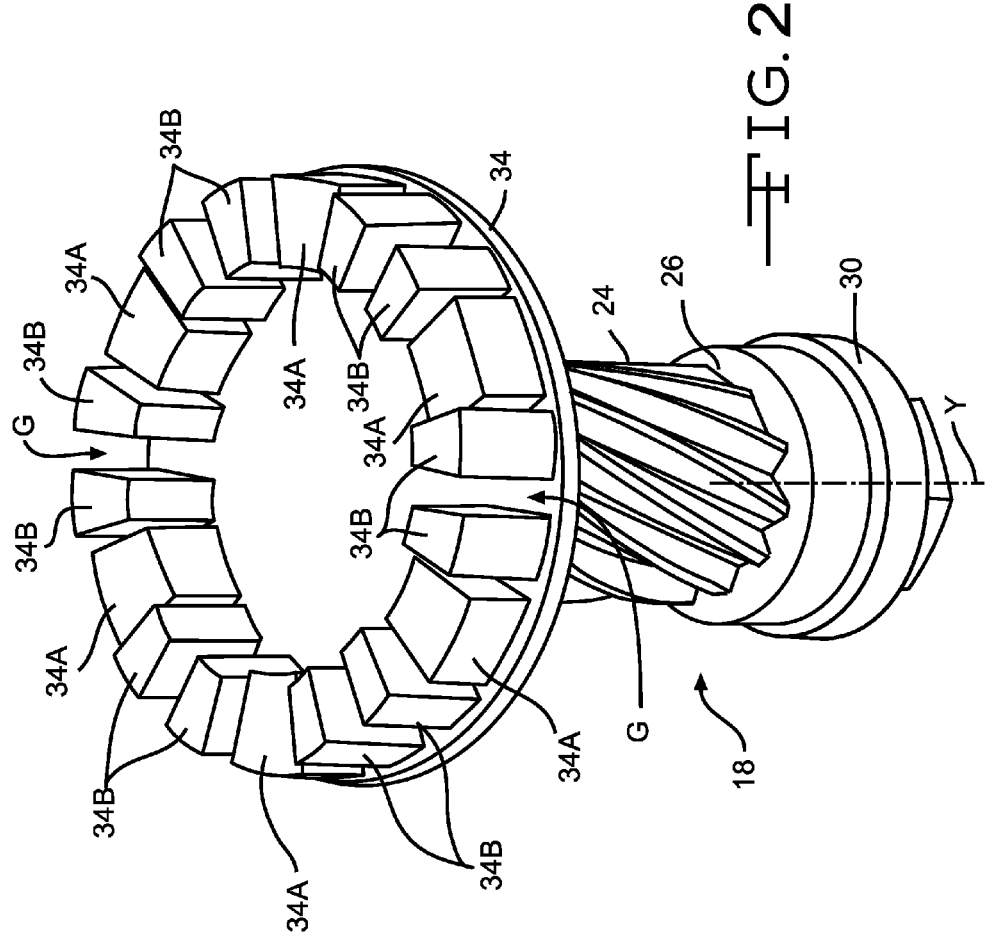
FIG. 2 is an enlarged view of a selected component of the vehicle electric power steering assembly illustrated in FIG. 1.

As best shown in FIG. 2, in the illustrated embodiment, the pinion main body 24 includes an annular-like plate 34 having a first plurality of "upstanding" projections or legs 34A, and a second plurality of projections or legs 34B, for a purpose to be discussed below. In the illustrated embodiment, the first plurality of legs 34A are preferably formed from the same material as the main body, for example preferably from "high strength" steel or other "high strength" metals. The second plurality of legs 34B are formed from preferably a rubber material, such as for example Hydrogenated Nitrile Butadiene Rubber (HNBR), Neoprene Rubber or other similar polymers, and are preferably bonded to the plate 34. As can be seen, the second plurality of legs 34B are arranged in a manner such that a respective one of such legs 34B is disposed on each side of the legs 34A and so that there is a gap, indicated generally at G, defined between each pair of legs 34B. Also, in the illustrated embodiment, each gap G is aligned with another gap G on an opposite side of the plate 34.

In the illustrated embodiment, the pinion body 24 defines a pinion axis Y and is provided with the external teeth T3 at least along a portion thereof. In the illustrated embodiment, the pinion axis Y is oriented coaxial with an axis Y1 of the output shaft 20A of the motor 20 and perpendicular with the rack axis X. Alternatively, the particular construction, configuration and/or design of the pinion assembly 18 and its associated components, may be other than illustrated and described, if so desired.

As shown in FIG. 1, in the illustrated embodiment, the planetary gear assembly 22 includes a carrier 40, a sun gear 42 and a plurality of planet gears 44. The sun gear 42 is configured to be "rotatably" attached to an output shaft 20A of the electric motor 20 and is provided with external gear teeth T4. In the illustrated embodiment, each of the planet gears 44 is disposed or carried on the carrier 40 by a dowel or pin member 46 which is disposed in an opening 40A provided in the carrier 40. Each of the planet gears 44 includes external gear teeth T5 which meshingly engage with the gear teeth T4 of the sun gear 42, for a purpose to be discussed below.

Figure 3:
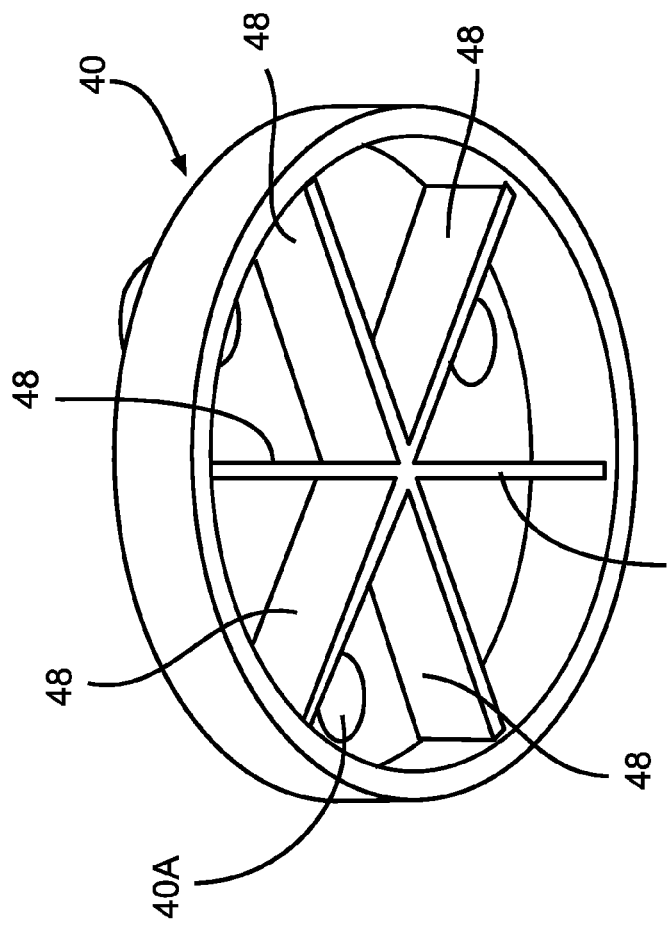
FIG. 3 is an enlarged view of another selected component of the vehicle electric power steering assembly illustrated in FIG. 1.
Figure 4:
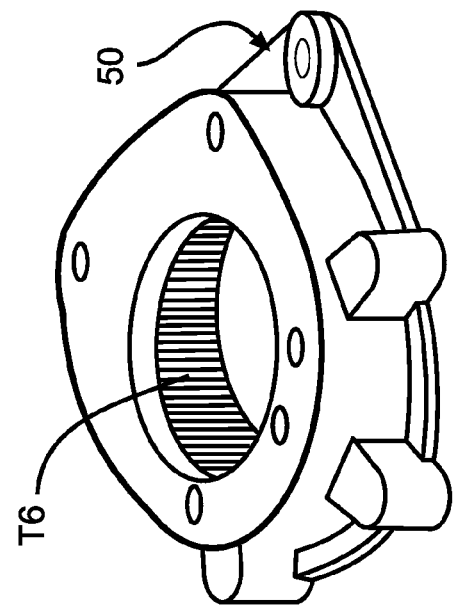
FIG. 4 is an enlarged view of another selected component of the vehicle electric power steering assembly illustrated in FIG. 1.

As best shown in FIG. 3, in the illustrated embodiment the carrier 40 is generally cup or dome like shaped and includes a plurality of ribs or spoke-like members 48 arranged in wagon-wheel like pattern as shown therein on an lower or underside portion thereof. A respective one of the ribs 48 is configured to be received or captured in a respective one of the gaps G provided between each pair of the legs 34B of the pinion assembly 18 so as to rotatably connect together the carrier 40 and the pinion assembly 18 as will be discussed below. Alternatively, the particular construction, configuration and/or design the planetary gear assembly 22 and its associated components, and/or the connection between the planetary gear assembly 22 and the pinion assembly 18, may be other than illustrated and described, if so desired.

In the illustrated embodiment, the electric power steering assembly 10 further includes a mounting plate or member 50. The mounting plate 50 is configured to be disposed between and secured to both the housing 12 and the motor 20. To accomplish this, preferably a first set of threaded fasteners 52 are provided to secure the mounting plate 50 to the motor 20, and a second set of threaded fasteners 54 are provided to secure the mounting plate 20 to the housing 12. As shown in FIG. 2, in the illustrated embodiment, the mounting plate 50 is provided with internal gear teeth T6 which meshingly engage with the external gear teeth T5 of the planet gears 44. Alternatively, the particular construction, configuration and/or design the mounting plate 50 may be other than illustrated and described, if so desired.

In operation in the illustrated embodiment, when the electric motor 20 is actuated the output shaft 20 will drive or rotate the sun gear 42 in a first direction, for example clockwise. In turn, the sun gear 42 will drive the planet gears 44 in a second opposite direction, for example counterclockwise, with the planet gears 44, along with the carrier 40 via the pins 46, tracking or running around the internal teeth T6 of the mounting plate 50. In turn the carrier 40 via the connection of the ribs 48 thereof in the gaps G of the pinion assembly 18, will cause the pinion assembly 18 to rotate in the same direction as that of the carrier 40. Such rotation of the pinion assembly 18 will result in linear movement of the rack member 14.

A potential advantage of the electric power steering assembly 10 is that the "direct drive" provided by the electric motor 20 to the rack member 14, via the planetary gear assembly 22 and the pinion assembly 18, allows the electric motor 20 (i.e., the axis Y1 and/or the output shaft 20A of the electric motor 20 and the axis Y and/or the output shaft 24 of the pinion assembly 18), to be located perpendicular to the rack axis X to thereby provide for smaller packaging requirements compared to known belt drive gears.

Also, with the electric motor 20 oriented perpendicular to the rack axis X, the electric motor 20 (along with the planetary gear assembly 22 and the pinion assembly 18), can be rotated about the rack axis X to any desired position to accommodate any package requirement. Also, the rubber legs 34B on the pinion assembly 18 may act as an isolator or damper to minimize or reduce any potential noise, vibration and harshness from electric motor 20 and through the planetary gear assembly 22 and the pinion assembly 18 from being transmitted to the rack member 14. In addition, the planetary gear assembly 22 will not experience the wear or stretch that occurs to the belt in a belt drive gear.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle electric power steering assembly comprising:
    a steering member configured to be disposed in a rack housing and including a first rack portion and a second rack portion, the first rack portion operatively connected to a vehicle steering wheel;
    an electric motor operatively connected to the second rack portion for effecting axial movement of the steering member upon rotation of the vehicle steering wheel;
    a planetary gear assembly operatively coupled to the electric motor; and
    a pinion assembly operatively disposed between the planetary gear assembly and the second rack portion whereby operation of the electric motor is operative to effect axial movement of the steering member by the electric motor actuating the planetary gear assembly, which in turn actuates the pinion assembly, which in turn actuates the steering member via the second rack portion;
    wherein the electric motor includes an output shaft which defines a motor axis and the pinion assembly includes an output shaft which defines a pinion axis, wherein the pinion axis is coaxial with the motor axis and perpendicular with respect to an axis of the steering member; and wherein a rubber isolator is provided in a connection which couples together the planetary gear assembly and the pinion assembly.

2. The vehicle electric power steering assembly of claim 1 wherein the isolator includes rubber elements provided on at least one of the planetary gear assembly and the pinion assembly.

3. The vehicle electric power steering assembly of claim 1 wherein a mounting member is provided between the electric motor and the rack housing, the mounting member configured to contain at least a portion of the planetary gear assembly and at least a portion of the pinion assembly.

4. The vehicle electric power steering assembly of claim 3 wherein the mounting member includes internal teeth which are operative to engage with teeth provided on planet gears of the planetary gear assembly.

5. The vehicle electric power steering assembly of claim 1 wherein the planetary gear assembly includes a sun gear operatively connected to the output shaft of the electric motor and a plurality of planet gears configured to be actuated by the sun gear and in turn configured to actuate the pinion assembly.

6. The vehicle electric power steering assembly of claim 1 wherein planet gears are configured to be coupled to a carrier of the planetary gear assembly, and the carrier is configured to be operatively coupled to the pinion assembly.

7. The vehicle electric power steering assembly of claim 6 wherein the isolator is provided in a connection which couples together the carrier of the planetary gear assembly and the pinion assembly.

8. A vehicle electric power steering assembly comprising:
a steering member configured to be disposed in a rack housing and including a first rack portion having first rack teeth and a second rack portion having second rack teeth, the first rack portion operatively connected to a vehicle steering wheel;
an electric motor operatively connected to the second rack portion for effecting axial movement of the steering member upon rotation of the vehicle steering wheel;
a planetary gear assembly operatively coupled to the electric motor; and
a pinion assembly operatively disposed between the planetary gear assembly and the second rack portion, the pinion assembly having teeth which engage the teeth of the second rack portion whereby operation of the electric motor is operative to effect axial movement of the steering member by the electric motor actuating the planetary gear assembly, which in turn actuates the pinion assembly, which in turn actuates the steering member via the second rack portion;
wherein the electric motor includes an output shaft which defines a motor axis and the pinion assembly includes an output shaft which defines a pinion axis, wherein the pinion axis is coaxial with the motor axis and perpendicular with respect to an axis of the steering member; and
wherein a rubber isolator is provided in a connection which couples together the planetary gear assembly and the pinion assembly.

9. The vehicle electric power steering assembly of claim 8 wherein the isolator includes rubber elements provided on at least one of the planetary gear assembly and the pinion assembly.

10. The vehicle electric power steering assembly of claim 8 wherein a mounting member is provided between the electric motor and the rack housing, the mounting member configured to contain at least a portion of the planetary gear assembly and at least a portion of the pinion assembly.

11. The vehicle electric power steering assembly of claim 10 wherein the mounting member includes internal teeth which are operative to engage with teeth provided on planet gears of the planetary gear assembly.

12. The vehicle electric power steering assembly of claim 8 wherein the planetary gear assembly includes a sun gear operatively connected to the output shaft of the electric motor and a plurality of planet gears configured to be actuated by the sun gear and in turn configured to actuate the pinion assembly.

13. The vehicle electric power steering assembly of claim 8 wherein planet gears are configured to be coupled to a carrier of the planetary gear assembly, and the carrier is configured to be operatively coupled to the pinion assembly.

14. The vehicle electric power steering assembly of claim 13 wherein the isolator is provided in a connection which couples together the carrier of the planetary gear assembly and the pinion assembly.

15. A vehicle electric power steering assembly comprising:
a steering member configured to be disposed in a rack housing and including a first rack portion and a second rack portion, the first rack portion operatively connected to a vehicle steering wheel;
an electric motor operatively connected to the second rack portion for effecting axial movement of the steering member upon rotation of the vehicle steering wheel;
a planetary gear assembly operatively coupled to the electric motor; and
a pinion assembly operatively disposed between the planetary gear assembly and the second rack portion whereby operation of the electric motor is operative to effect axial movement of the steering member by the electric motor actuating the planetary gear assembly, which in turn actuates the pinion assembly, which in turn actuates the steering member via the second rack portion;
wherein the electric motor includes an output shaft which defines a motor axis and is operatively coupled to the planetary gear assembly, the pinion assembly includes an output shaft which defines a pinion axis and which is operatively coupled to the second rack portion, wherein the pinion axis is coaxial with the motor axis and perpendicular with respect to an axis of the steering member; and
wherein a rubber isolator is provided in a connection which couples together the planetary gear assembly and the pinion assembly.

16. The vehicle electric power steering assembly of claim 15 wherein the isolator includes rubber elements provided on at least one of the planetary gear assembly and the pinion assembly.

17. The vehicle electric power steering assembly of claim 15 wherein a mounting member is provided between the electric motor and the rack housing, the mounting member configured to contain at least a portion of the planetary gear assembly and at least a portion of the pinion assembly, wherein the mounting member includes internal teeth which are operative to engage with teeth provided on planet gears of the planetary gear assembly.

* * * * *